US011366869B2

(12) United States Patent
Bitondo et al.

(10) Patent No.: US 11,366,869 B2
(45) Date of Patent: Jun. 21, 2022

(54) CACHE OPTIMIZATION FOR WEB SITES RUNNING A/B TEST

(71) Applicant: Walmart Apollo, LLC, Bentonville, AR (US)

(72) Inventors: Stephen A. Bitondo, Carlsbad, CA (US); Anthony Tang, San Diego, CA (US); Shriram Sharma, San Diego, CA (US); Girish Subramanian, San Diego, CA (US); Duy Le, San Diego, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 844 days.

(21) Appl. No.: 16/213,877

(22) Filed: Dec. 7, 2018

(65) Prior Publication Data

US 2020/0183999 A1 Jun. 11, 2020

(51) Int. Cl.
*G06F 16/957* (2019.01)
*G06F 9/451* (2018.01)
*G06F 11/30* (2006.01)
*G06F 11/34* (2006.01)
*G06F 12/0802* (2016.01)

(52) U.S. Cl.
CPC .......... *G06F 16/9574* (2019.01); *G06F 9/451* (2018.02); *G06F 11/302* (2013.01); *G06F 11/3428* (2013.01); *G06F 12/0802* (2013.01); *G06F 2212/1021* (2013.01)

(58) Field of Classification Search
CPC ............... G06F 11/302; G06F 11/3428; G06F 12/0802; G06F 16/9574; G06F 9/451
USPC ........................................................ 702/186
See application file for complete search history.

(56) References Cited

U.S. PATENT DOCUMENTS

| 2014/0019749 A1* | 1/2014 | Whitehead | .......... | H04L 63/0428 |
| | | | | 713/150 |
| 2019/0239103 A1* | 8/2019 | Tang | ..................... | H04W 24/08 |

* cited by examiner

*Primary Examiner* — John H Le
(74) *Attorney, Agent, or Firm* — Duane Morris LLP; Manita Rawat

(57) ABSTRACT

Systems and methods for cache optimization are disclosed. A request for a user interface is received from a first user device. The request includes a user key. An interface key corresponding to an interface template of the requested user interface is generated from the user key. The interface template of the requested user interface is loaded. The interface template includes one or more edge side include (ESI) identifiers in the interface template. An element key corresponding to a first ESI element associated with a first of the one or more ESI identifiers is generated from the user key. The first ESI element is loaded and positioned at a location within the interface template identified by the first of the one or more ESI identifiers. A complete user interface is provided to the first user device. The complete user interface includes the interface template having the first ESI element positioned therein.

20 Claims, 6 Drawing Sheets

CACHE OPTIMIZATION FOR WEB SITES RUNNING A/B TEST

TECHNICAL FIELD

This application relates generally to caching systems and, more particularly, relates to caching systems in an A/B testing environment.

BACKGROUND

A/B testing (also known as split testing or bucket testing) is a method of comparing two versions of a system or interface against each other to determine which system performs better with respect to one or more selected metrics. A/B testing presents two or more variants of an interface to a selection of users at random and statistical analysis is used to determine which variation performs better for a given system goal. In some instances, A/B testing is performed between a current production version of a system and a potential implementation of a system.

In order to provide experimental variations, A/B testing requires a web server (or other system) to provide at least two version of a user interface: a current version (control) and a variation of the current version (test). The user engagement with each version is measured. As the number of experiments in A/B testing system increases, the number of potential page variations grows exponentially. For example, if the A/B testing system has 20 active experiments each having a control version and a single variation, the total number of possible interfaces that can be provided are 2^20, or 1,048,576 variations. The large number of variations make it very difficult or even impossible for a caching system to maintain a cached version of each possible variation.

SUMMARY

In various embodiments, a system including a computing device is disclosed. The computing device is configured to receive a request for a user interface from a first user device. The request includes a user key. An interface key corresponding to an interface template of the requested user interface is generated from the user key. The interface template of the requested user interface is loaded. The interface template includes one or more edge side include (ESI) identifiers in the interface template. An element key corresponding to a first ESI element associated with a first of the one or more ESI identifiers is generated from the user key. The first ESI element is loaded and positioned at a location within the interface template identified by the first of the one or more ESI identifiers. A complete user interface is provided to the first user device. The complete user interface includes the interface template having the first ESI element positioned therein.

In various embodiments, a non-transitory computer readable medium having instructions stored thereon is disclosed. The instructions, when executed by a processor cause a device to perform operations including receiving a request for a user interface from a first user device, wherein the request includes a user key. The device generates an interface key corresponding to an interface template of the requested user interface. The interface key is generated from the user key. The device loads the interface template of the requested user interface. The interface template includes one or more edge side include (ESI) identifiers in the interface template. An element key is generated corresponding to a first ESI element associated with a first of the one or more ESI identifiers. The element key is generated from the user key. The first ESI element is loaded and positioned at a location within the interface template identified by the first of the one or more ESI identifiers. The device provides a complete user interface to the first user device. The complete user interface comprises the interface template including the first ESI element.

In various embodiments, a method is disclosed. The method includes receiving a request for a user interface from a first user device, wherein the request includes a user key. The device generates an interface key corresponding to an interface template of the requested user interface. The interface key is generated from the user key. The device loads the interface template of the requested user interface. The interface template includes one or more edge side include (ESI) identifiers in the interface template. An element key is generated corresponding to a first ESI element associated with a first of the one or more ESI identifiers. The element key is generated from the user key. The first ESI element is loaded and positioned at a location within the interface template identified by the first of the one or more ESI identifiers. The device provides a complete user interface to the first user device. The complete user interface comprises the interface template including the first ESI element.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, a method of cache optimization for caching a user interface in an A/B testing system is disclosed. The method includes receiving a user key including an interface identifier and one or more element identifiers from a user system. The A/B testing system generates an interface key from the user key and loads an interface template from a cache system using the interface key. The interface template includes at least one element tag corresponding to an experiment implemented by the A/B testing system. The A/B testing system generates an optimized element key from the user key for each element tag in the interface template and loads a corresponding experimental element from the cache system using the element key.

Figure 1:
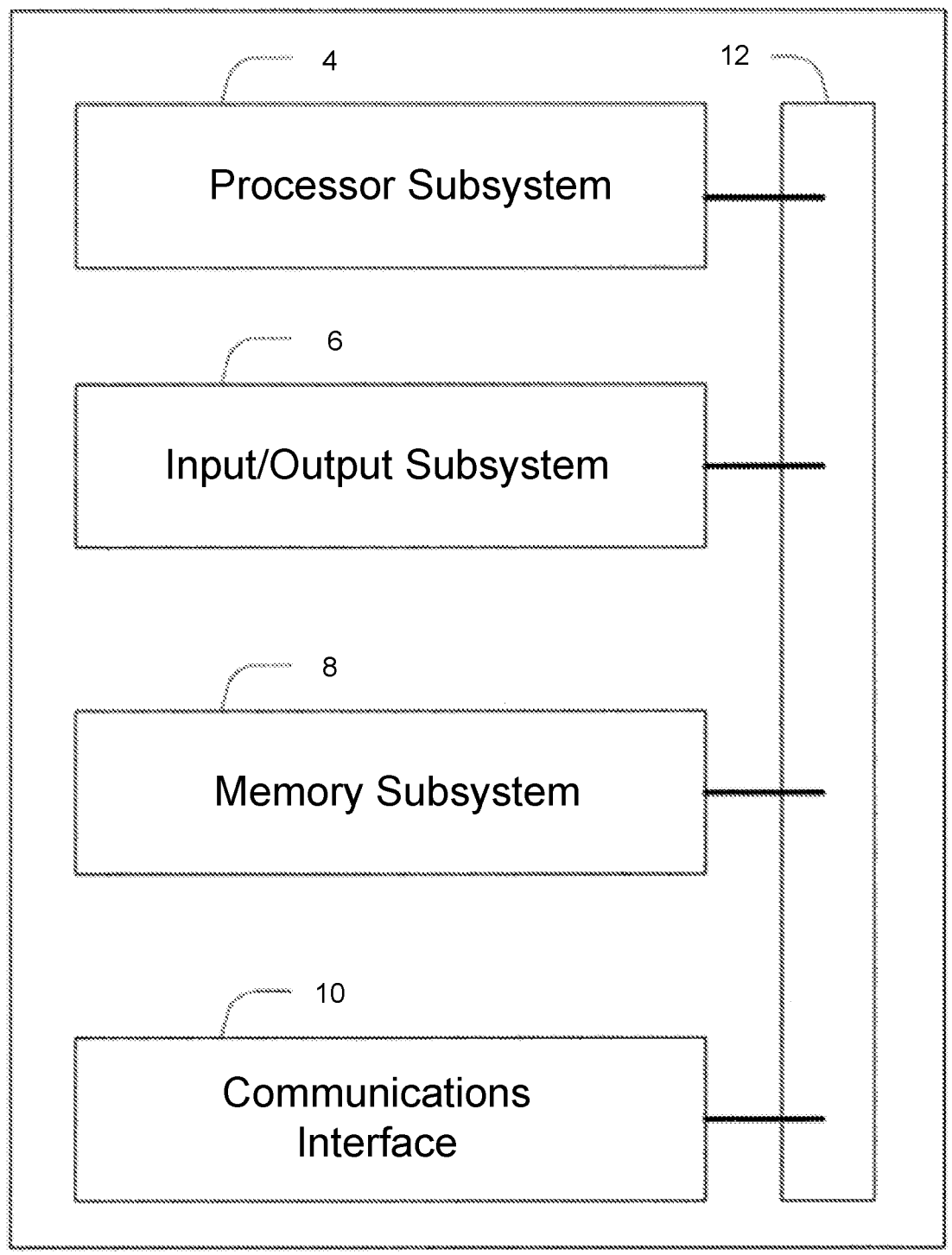
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 2 components may be combined or omitted such as, for example, not including a input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferro-electric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods including A/B testing and cache optimization, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
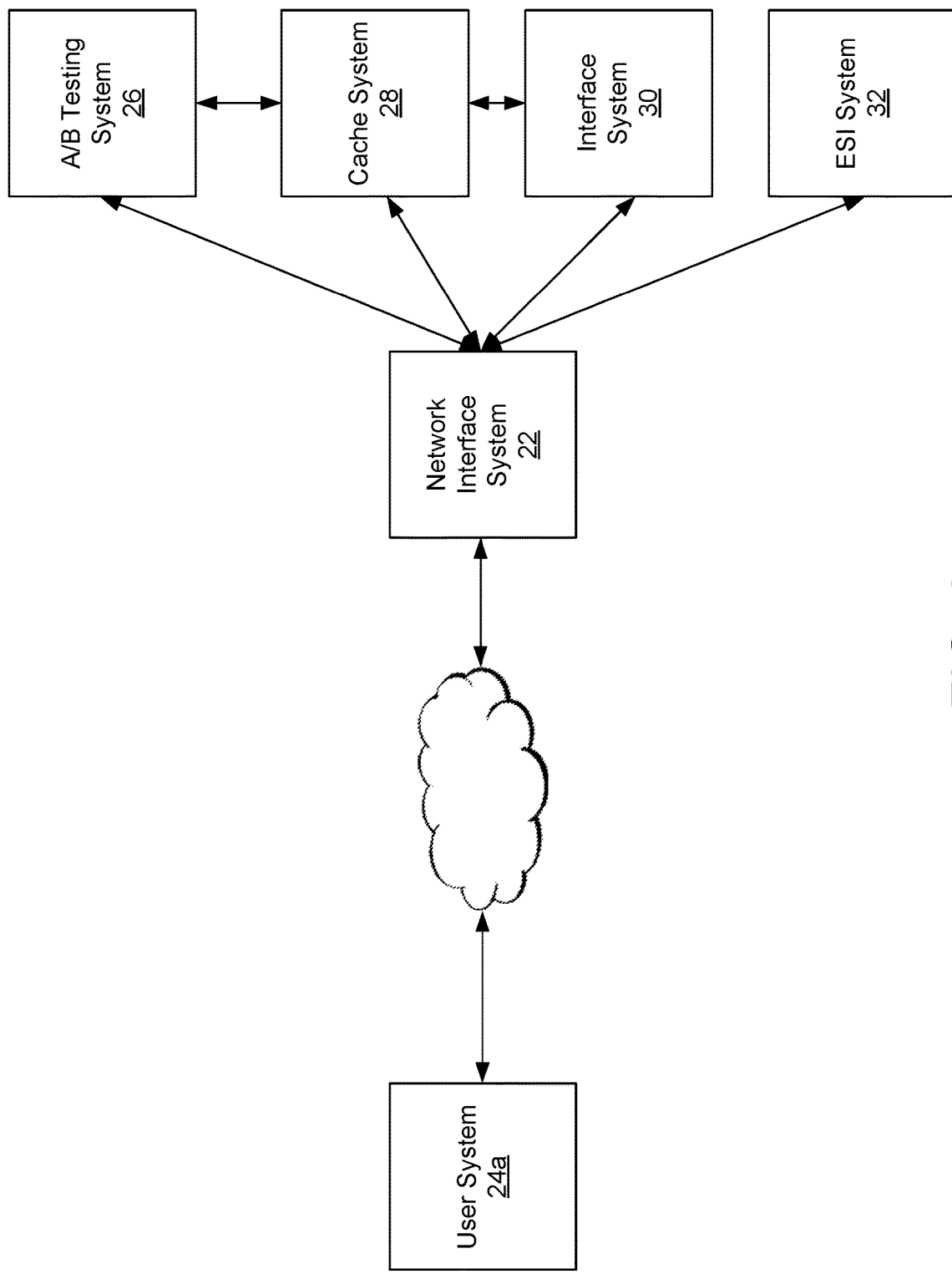
FIG. 2 illustrates a network configured to provide A/B testing, in accordance with some embodiments.

FIG. 2 illustrates a network 20 including a network interface system 22, a first user system 24, an A/B testing system 26, a cache system 28, an interface system 30, and an edge side include (ESI) system 32. Each of the systems 22-32 can include a system 2 as described above with respect to FIG. 1, and similar description is not repeated herein. Although the systems are each illustrated as independent systems, it will be appreciated that each of the systems may be combined, separated, and/or integrated into one or more additional systems. For example, in some embodiments, network interface system 22, the A/B testing system 26, the cache system 28, the interface system 30, and/or the ESI system 32 may be implemented by a shared server or shared network system. Similarly, the user system 24 may be integrated into additional user systems, such as a networked system or server in a user environment.

In some embodiments, the network interface system 22 is configured to provide a network interface to the user system 24. For example, in some embodiments, the network interface system 22 is configured to provide a webpage, web portal, and/or other network access interface to the user system 24. As one example, in some embodiments, the network interface system 22 is configured to provide a webpage having an e-commerce interface for identifying and purchasing one or more goods, although it will be appreciated that the disclosed systems and methods can be applied to any suitable network access interface provided via a network to one or more systems. In some embodiments, the network interface system 22 includes a front-end web-server, although it will be appreciated that the network interface system 22 can include any suitable front-end system.

In some embodiments, the network interface system 22 is configured to provide a network access interface including one or more pages. The term "page" is used herein to refer to specific portions of the network access interface, including, but not limited to, one or more static interfaces (e.g., webpages, files, etc.), one or more dynamic interfaces (e.g., graphical user interface, video interface, virtual reality interface, etc.), applications (e.g., mobile applications, desktop applications, etc.) and/or any other suitable interface. Each page includes one or more elements provided to a user system 24, for example, for presentation to a user, for processing, etc. As used herein, the term "element" can refer to any content included in a page, including, but not limited to, presentation content (e.g., text, figures, backgrounds, colors, etc.), processing content (e.g., non-user visible code, executables, etc.), passive content (e.g., sensors, loggers, etc.), and/or any other suitable content.

In some embodiments, the A/B testing system 26 is configured to implement one or more experiments. Experiments include variations of at least one element included in a page and are designed to assess one or more metrics. For example, in some embodiments, a page can include a base (or control) element or at least one variant of that element. The variant element alters at least one user presentation and/or interaction with the page. For example, in various embodiments, a variant element can include variant content (e.g., variant banners, images, text, colors, etc.), variant positions, variant responses, etc. as compared to a base element. When a user system 24 connects to the A/B testing system 26, the user system 24 is randomly assigned to one or more experiments for each page included in the network interface. For each experiment, a user system 24 is designated as being in either a control group (i.e., receiving the base element) or a variant group (i.e., receiving a variant element). Interactions between the user systems 24 and the network interface system 22 can be analyzed to determine whether a variant element increases one or more desired metrics. Desired metrics can include domain specific metrics. For example, metrics in an e-commerce environment may include engagement time, completion percentage, processing time, and/or any other suitable e-commerce metric.

In some embodiments, the A/B testing system 26 implements multiple experiments per page. Multiple experiments on a single page may alter the same and/or different elements presented on the page. Experiments that provide variant elements for the same element and/or that make non-compatible changes are considered mutually exclusive (i.e., the experiments cannot or should not be presented together). Experiments that are not mutually exclusive include variant elements that are compatible or can be presented together. For example, in some embodiments, a user system 24 can be assigned to, at most, one of a set of mutually exclusive experiments maintained by the A/B testing system 26. The user system would then receive a page including element(s) from the one assigned experiment's control or variant element. Alternatively, the user system 24 can be assigned to multiple non mutually exclusive experiments. In this case the user system would receive a page including control element(s) or variant element(s) from one or more of these experiments. The network access interface can include any number of mutually exclusive and/or non-mutually exclusive elements and/or variants.

When a user system 24 interacts with the network interface system 22, the A/B testing system 26 automatically assigns the user system 24 to one or more experiments. Within each experiment, the user system 24 is assigned to a control group or a variant group for that experiment. The user may be assigned to one experiment per layer (e.g., each of one mutually exclusive experiment can be selected). For example, in embodiments including an e-commerce interface, each presented page of the e-commerce network can contain multiple layers each having one or more experiments. In some embodiments, when a user system 24a, 24b interacts with a specific webpage, the A/B testing system 26 provides, at most, one selected control or variant element for each layer contained within the selected webpage. For example, in one embodiment, a page may contain a first control element or a first variant element contained in a first layer and a second control element or a second variant element contained in a second layer of the page.

As another example, in one embodiment including a page having a single experiment including a single variant element, each user system 24 that interacts with the page and that is assigned to the experiment is provided either a version of the page containing the base element or a version of the page containing the variant element. Various iterations may result in the following assignments: first user system 24 assigned to base element, second user system 24 assigned to variant element; first user system 24 assigned to variant element, second user system 24 assigned to base element; each of the first user system 24 and the second user system 24 are assigned to the base element; or each of the first user system 24 and the second user system 24 are assigned to the variant element. Additional user systems (not shown) and/or additional experiments (in the same or different layers) exponentially increase the potential number of iterations that are possible for assignment and presentation to user systems 24.

Each interaction between a user system 24 and the network interface system 22 includes a data exchange. In some embodiments, each data exchange includes a user key generated by the user system 24 and/or the network system 22. The user key can include identifiers regarding which pages (or other elements) of the network interface system 22 are requested by the user system 24 and/or experiments assigned to the user system 24. The user key may be generated by the user system using one or more records stored on the user system 24 (e.g., a beacon, a cookie, etc.), the network interface system 22 (e.g., a log, a cookie, a cache key, etc.), and/or any other suitable records.

For example, in some embodiments, the user key contains variables identifying a base interface page and base or variant elements for experiments in which the user system 24 is enrolled. In some embodiments, the user key includes an experiment variable indicating that the user system 24 has been assigned to an experiment and relies on the network interface system 22 to select the correct base or variant element for presentation to the user system 24.

The user system 24 interacts with a page (or other interface element) provided by the network interface system 22 to perform one or more operations. For example, typical interactions in an e-commerce network interface system 22 include, but are not limited to, identifying product categories or search terms of interest, selecting one or more items for inclusion in a user cart, performing a check-out operation, creating a user account, etc. When a user system 24 interacts with a page containing an experiment, subsequent interactions between the user system 24 and the network interface system 22 can be analyzed to determine the effectiveness of the variant element included in the experiment. If a user system 24 interacts with a page including an experiment and the user system 24 is provided either a base element or the variant element associated with the experiment, the user system 24 is considered "qualified" to be included in analysis of the experiment presented on the page.

In some embodiments, the network environment 20 includes an ESI system 32. The ESI system 32 is configured to implement a method for dynamic interface content assembly. The ESI system 32 is configured to receive an interface template (e.g., a base page) including one or more ESI tags. The ESI tags instruct the ESI system 32 to take a predetermined action, such as, for example, loading an element from the interface system 30. In some embodiments, the element is an experimental element having a control or variant option. The ESI system 32 identifies each element tag in the interface template and generates a complete user interface by loading elements into each location identified by an ESI tag.

Figure 3:
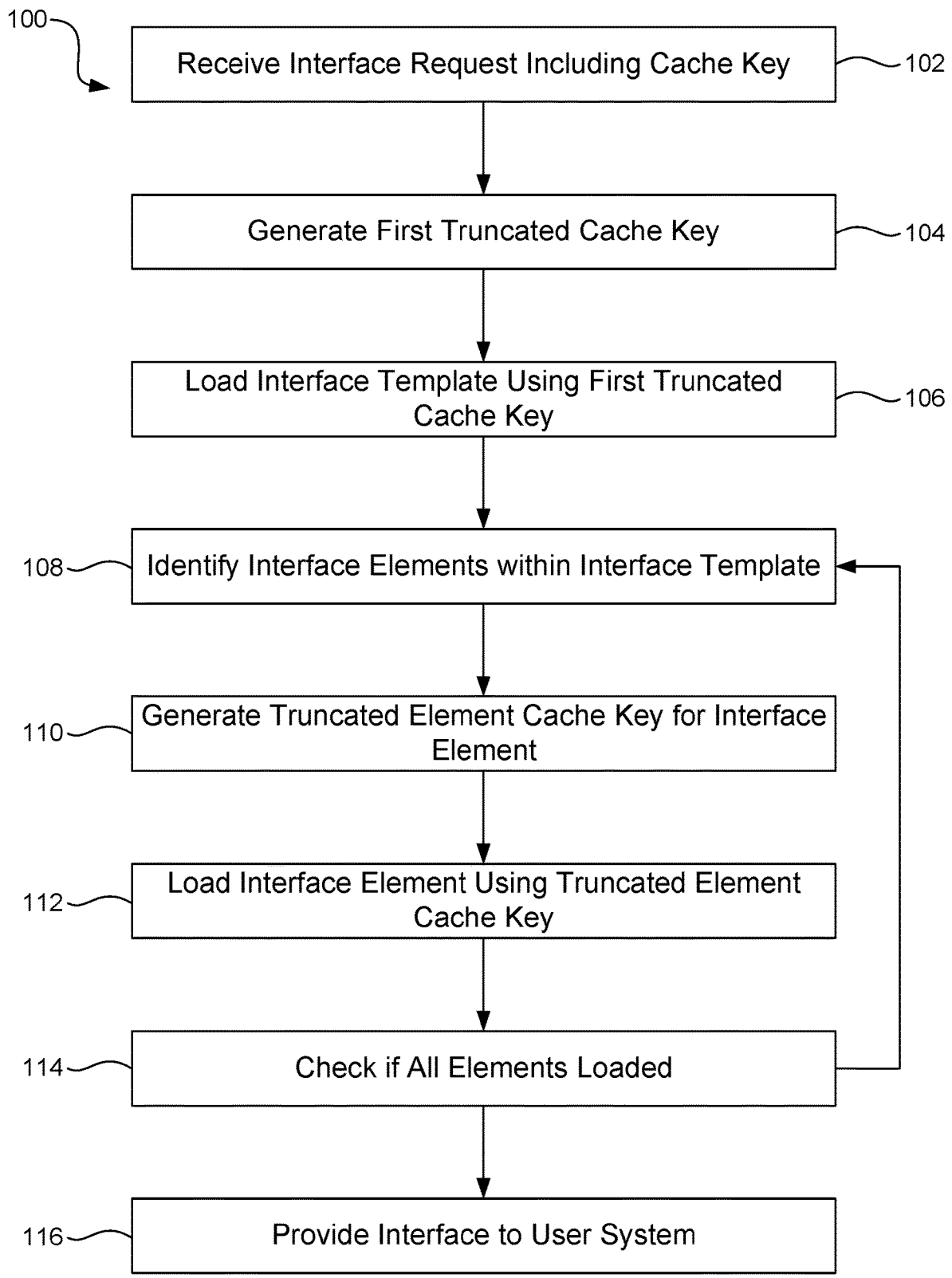
FIG. 3 is a flowchart illustrating a method of cache optimization for the caching system of the network illustrated in FIG. 2, in accordance with some embodiments.
Figure 4:
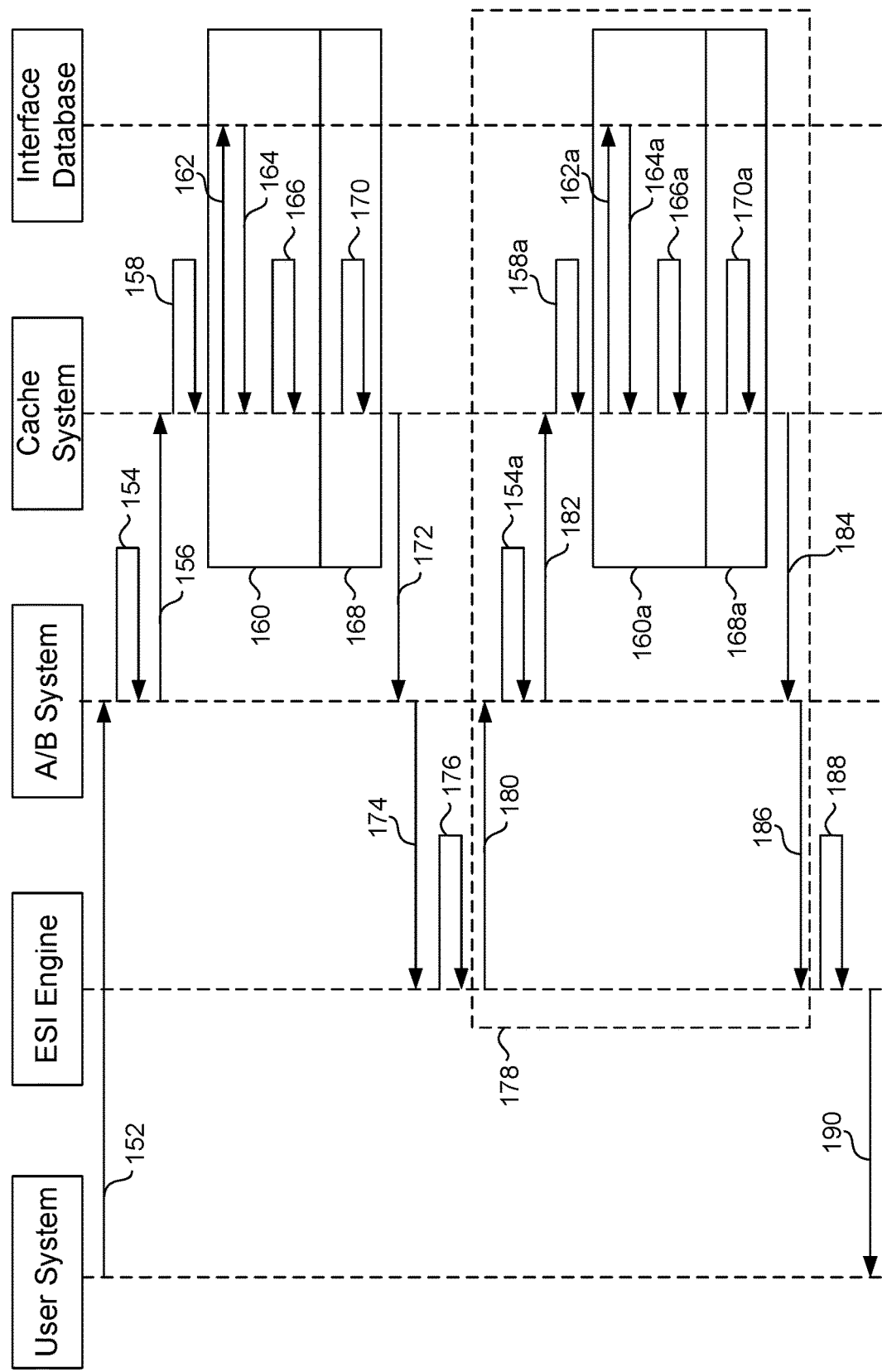
FIG. 4 is a flow diagram illustrating the process of cache optimization illustrated in FIG. 3, in accordance with some embodiments.

FIG. 3 is a flowchart illustrating a method 100 of cache optimization in an A/B testing environment, such as the network 20 illustrated in FIG. 2, in accordance with some embodiments. FIG. 4 is a sequence diagram 150 illustrating the method of cache optimization 100 illustrated in FIG. 3, in accordance with some embodiments. As discussed in greater detail below, the method 100 allows a cache system to store a limited number of cached templates and elements such that the total amount of cached data can be drastically reduced.

At step 102, a request 152 for a user interface is received by the A/B testing system 26 from the user system 24. The request 152 includes a user key that provides information regarding the requested user interface. For example, the user key may include an identifier related to which portion (e.g., page) of the user interface is requested, an identifier related to control and/or experimental variables corresponding to experiments in which the user is enrolled, and/or any other suitable identifiers. In some embodiments, the user key is generated based on a base key or other value generated by one or more of the network interface system 22, the A/B testing system 26, the cache system 28, and/or any other suitable system. In some embodiments, the cache key can include a cache key containing only experiment variables associated with variant groups as described in U.S. patent application Ser. No. 15/882,942, filed Jan. 29, 2018, and entitled "SHARED EXPERIMENT CONTROL," which is incorporated herein by reference in its entirety.

At step 104, the A/B testing system 26 optimizes 154 the received user key to generate an optimized interface key. In some embodiments, the interface key includes one or more identifiers related to a base page (or interface template) of the user interface requested. In some embodiments, element specific identifiers, such as identifiers related to control and/or experimental variables of one or more experimental elements, are removed from the user key to generate the interface key. For example, the user key can be truncated at a predetermined position to generate the interface key. In other embodiments, the interface key is a predetermined key selected from a plurality of keys based on one or more identifiers related to the requested page.

At step 106, the interface key is provided 156 to the cache system 28, which performs a cache lookup operation 158 to load an interface template (e.g., base page) identified by the interface key. The cache lookup operation 158 performs a check to determine if the template is stored in the cache maintained by the cache system 28. If the interface template has not been previously cached, the cache system 28 encounters a cache miss 160. When a cache miss 160 occurs, the cache system 28 requests 162 the interface template from the interface system 30, which maintains a database of interface templates and elements. The cache system 28 receives 164 the interface template and stores 166 the interface template in the cache maintained by the cache system 28. If the requested component has been previously cached, the cache system 28 encounters a cache hit 168 and loads 170 the cached copy from the cache.

The interface template is provided to an edge side includes (ESI) system 32 configured to generate a complete user interface based on the interface template. In the illustrated embodiment, the interface template is provided 172 from the cache system 28 to the A/B testing system 26 and provided 174 from the A/B testing system 26 to the ESI system 32, although it will be appreciated that the interface template can be provided directly from the cache system 28 to the ESI system 32 in some embodiments. The interface template includes one or more ESI element tags (or statements) that identify dynamic elements to be inserted into the interface template to generate a complete interface. The dynamic elements can include one or more elements involved in A/B testing, such as, for example, one or more elements having a control element option and a variant element option. The ESI system 32 is configured to load a selected one of the elements associated with each ESI element tag to generate the completed interface.

At step 108, the ESI system 32 evaluates 176 an ESI element tag (or statement) included in the interface template to identify a required element associated with the ESI element tag. For example, in some embodiments, the ESI system 32 evaluates an ESI element tag and the user key to identify one of a control component or a variant component associated with the ESI element tag and assigned to the user based on the user key. In other embodiments, an additional system, such as the A/B testing system 26, is configured to evaluate the user key and generate an input to the ESI system 32 identifying the control element or variant element associated with an ESI element tag.

At step 110, an optimized element key is generated from the user key for the identified element associated with the ESI tag. The element key may be generated by one or more of the ESI system 32, the A/B testing system 26, the cache system 28, and/or any other suitable system. For example, in some embodiments, the ESI system 32 provides 180 the user key and an element tag to the A/B testing system 26, which initiates a key optimization process 154a for generating an element key from the user key for the identified element. Although embodiments are illustrated with the A/B testing system 26 executing the key optimization process 154a, it will be appreciated that the ESI system 32, the cache system 28, and/or any other suitable system can execute the key optimization process 154a.

In some embodiments, the optimized element key is generated by truncating the user key at a predetermined location corresponding to a number or position of the ESI tag in the interface template, i.e., the user key is truncated at a first position corresponding to a first ESI tag to generate a first element key, a second position corresponding to a second ESI tag to generate a second element key, a third position corresponding to a third ESI tag to generate a third element key, etc. The truncation positions may be sequentially generated by selecting a predetermined number of characters in the user key equal to the previously generated truncation key plus a predetermined number of characters corresponding to the next ESI tag. In other embodiments, truncated element keys may be generated based on non-sequential, predetermined methods for each ESI tag in the interface template.

At step 112, an ESI element corresponding to the ESI element tag is loaded into the interface template using the optimized element key. For example, in the illustrated embodiments, the A/B testing system 26 provides 182 the optimized element key to the cache system 28, which performs a cache lookup operation 158*a* to determine if the ESI element is stored in the cache. If the ESI element has not been previously cached, the cache system 28 encounters a cache miss 160*a*. When a cache miss 160*a* occurs, the cache system 28 requests 162*a* the ESI element from the interface system 30. The cache system receives 164*a* the ESI element and stores 166*a* the ESI element in the cache. If the requested ESI element has been previously cached, the cache system 28 encounters a cache hit 168*a* and loads 170*a* the cached copy from the cache. After obtaining the requested ESI element, the ESI system 32 loads ESI element into the interface template at a position indicated by the ESI tag. For example, in the illustrated embodiment, the cache system 28 provides 184 the ESI element to the A/B testing system 26, which provides 186 the ESI element to the ESI system 32.

At step 114, the ESI system 32 determines if ESI elements have been loaded for all ESI tags within the interface template. If one or more ESI tags remain unfilled (e.g., an ESI element has not been loaded), the method 100 returns to step 108 and performs the ESI completion process 178. The method 100 iterates through steps 108-114 (repeating the completion process 178) until all ESI tags in the interface template have been filled. If, at step 114, the ESI system 32 determines that all ESI elements have been loaded, the method 100 proceeds to step 116.

At step 116, a user-specific interface is generated 188 and provided 190 to the user system 24. The user-specific interface includes the interface template and each of the selected ESI elements. The user-specific interface includes ESI elements corresponding to each A/B experiment in which the user is enrolled (i.e., control element, variant element) and includes base page elements of the interface template. The user-specific interface can include any suitable interface, such as a webpage, web portal, and/or other network access interface.

The method 100 of cache optimization provides a reduction in the total amount of data, such as webpages, interfaces, etc., that must be cached by the cache system 28. For example, in a traditional system, an interface including 20 experiments each having a control element and a variant element results in $2^{20}$ or 1,048,576 potential user interfaces to be cached. The amount of storage required for storing the exponential number of user interface is prohibitive in current systems, reduces the effectiveness of the cache, and results in additional calls to the interface system 30 (which introduces additional lag into the interface generation process). In contrast, The cache optimization method 100 can identify experiments that are not testing changes to the interface element that is being requested and eliminate such experiments from the user key. The cache optimization method 100 results in storing substantially fewer interface elements, for example, as few as one interface element. In some embodiments, no active experiments may be testing changes to the interface that is being requested. In this embodiments, the cache optimization method 100 may result in the need to cache a single user interface—the default unchanged untested version. In other embodiments, the cache optimization method 100 may result in the need to store more than 1, but still many fewer than 1048576 interface elements. To continue the prior example, in some embodiments, the cache optimization method 100 results in storing a number of interface elements equal to 1+2*20 or 41 total elements, i.e., an interface template, a control element for each experiment, and a variant element for each experiment. In this example, the total data required to be stored by the cache system 28 using the cache optimization method 100 is less than 0.00391% of the data required by a traditional cache system. Although specific embodiments of the cache optimization method 100 are discussed herein, it will be appreciated that the actual number of interface elements that need to be stored depends on the specific experiments that are running and the changes (e.g., treatments, variations) that are being tested. A cache system 28 using the cache optimization method 100 provides faster response, lower storage needs, and can serve a greater number of user interfaces and/or users as compared to the traditional cache system.

Figure 5:
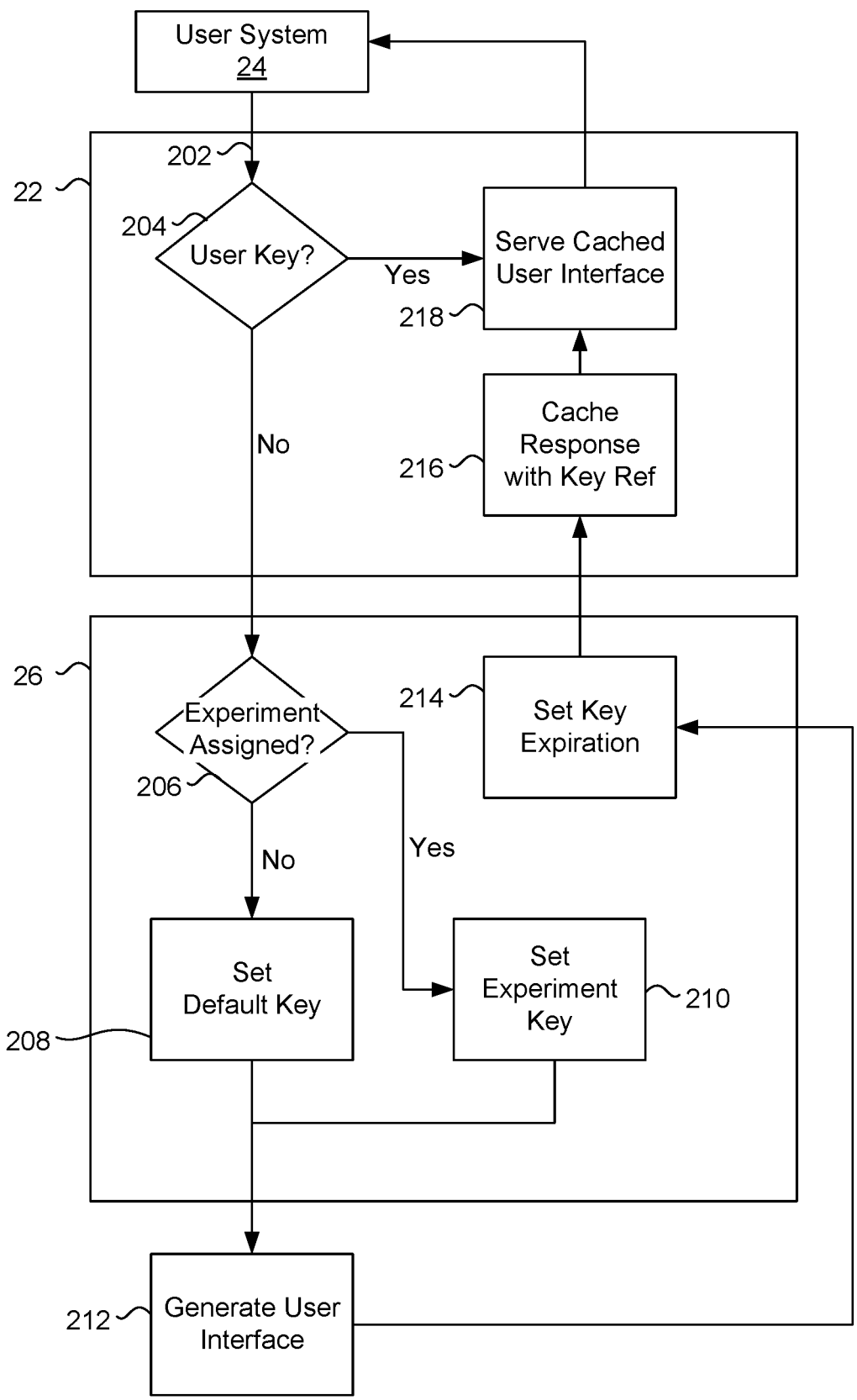
FIG. 5 illustrates a system flow for generating a user key, in accordance with some embodiments.

FIG. 5 illustrates a system flow 200 for generating and providing a user key, in accordance with some embodiments. During an interaction with the network system 22, the user system 24 provides a user interface request 202 to the network system 22. A system, such as the AB testing system 26, determines 204 if the user interface request 202 includes a user key. As discussed below, the cache system 28 generates a key that is stored on the user system 24 which can be used by the user system 24 to generate a user key with a user interface request 202.

If the A/B testing system 26 determines that the interface request does not include a user key, the A/B testing system 26 determines 206 if the user system 24 has been assigned to one or more experiments maintained by the A/B testing system 26 and/or assigns the user system 24 to one or more experiments. If the user system 24 is not assigned to at least one experiment, a generic key is generated 208 corresponding to a default (or non-experimental) version of the user interface. If the user system 24 is assigned to at least one experiment, a user key including identifiers for one or more experiments implemented by the A/B testing system 26 is generated 210. In some embodiments, the user key includes identifiers for each experiment implemented in the A/B testing system 26 whether or not the user system 24 is enrolled in each experiment. In other embodiments, the user key includes identifiers only for those experiments in which the user system 24 is enrolled.

After generating a user key, the network system 22 generates 212 a user interface for the user system 24, for example, according to the method 100 discussed above. The user interface includes an interface template and one or more ESI elements positioned within the template. In some embodiments, a time limit is set 214 for the user key. For example, in some embodiments, after a predetermined time period without a user interaction with the network system 22, the network system 22 determines that the user interaction is complete and deletes the user key and, potentially, one or more cached copies of the user interface stored in conjunction with the user key. The predetermined time period can be set to any predetermined time, such as, for example, 15 minutes, 20 minutes, 30 minutes, 45 minutes, 60 minutes, etc. In other embodiments, the user key is persistent and does not have an expiration time period associated therewith.

In some embodiments, the cache system 30 generates 216 a cached copy of a complete user interface generated for the user system 24. The complete user interface can be stored in the cache in conjunction with (or referenced by) the user key such that any subsequent interactions between the user system 24 and the network system 22 provide the cached copy of the user interface. In some embodiments, the cached copy of the complete user interface is maintained only for the predetermined time period associated with the user key. For example, if the user key expires after 30 minutes of non-communication between the network system 22 and the user system 24, the cache system 30 can be configured to purge, or delete, cached copies associated with the expiring user key after 30 minutes.

The cache system 28 serves 218 the cached page based on the user key. In some embodiments, for each subsequent interaction between the user device 24 and the network system 22, the cache system 30 directly serves the cached copy of the user interface based on the user key provided by the user system. As discussed above, after a predetermined time period has elapsed, the user key expires and the cache is purged of one or more user interfaces stored therein and associated with the user key.

Figure 6:
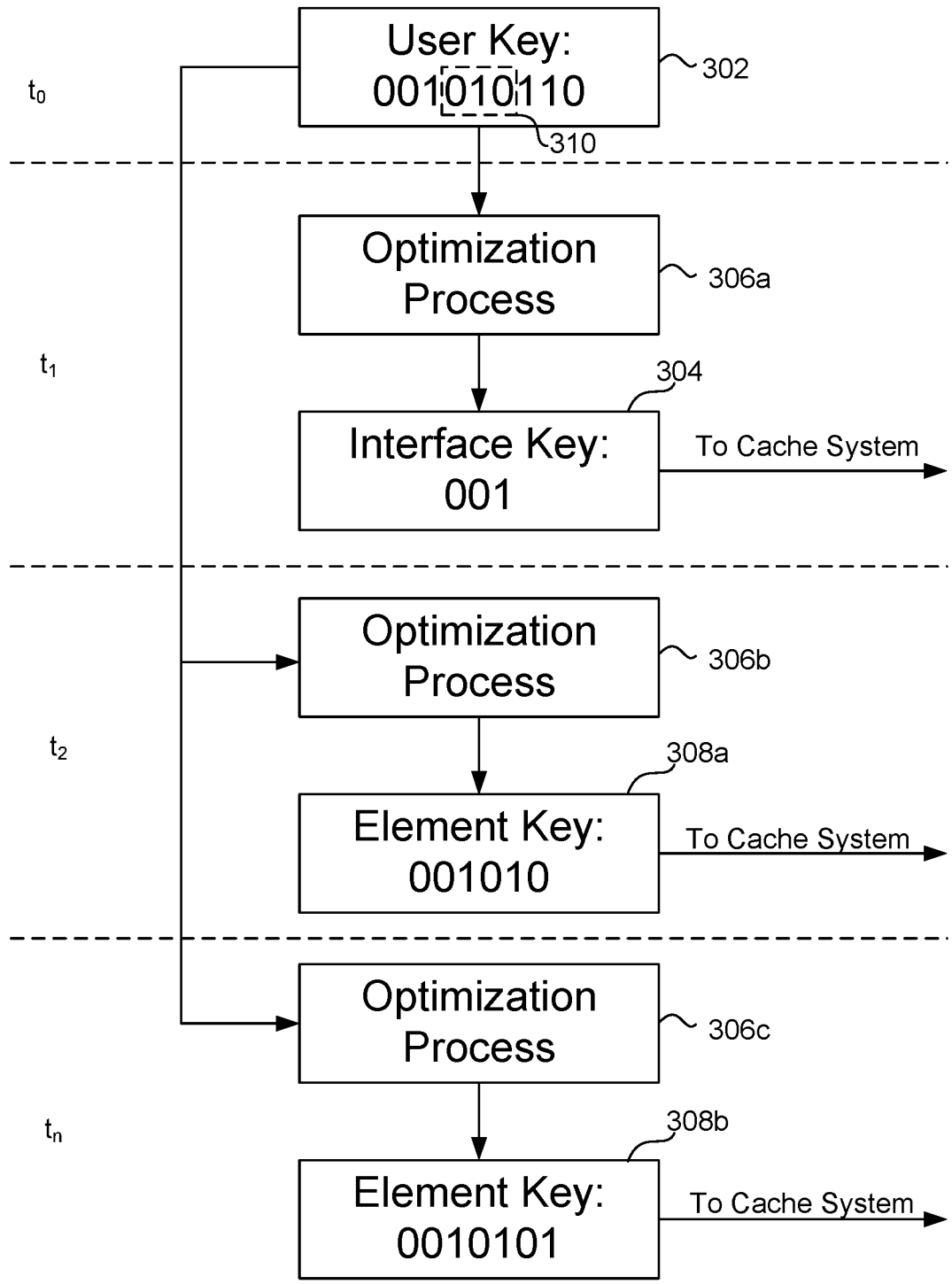
FIG. 6 illustrates a system flow for generating an optimized interface key and a plurality of optimized element keys from a user key, in accordance with some embodiments.

FIG. 6 illustrates a system flow 300 for generating an optimized interface key, in accordance with some embodiments. At time $t_0$, a system, such as the A/B testing system 26, receives a user key 302 from a user system 24. The user key can include identifiers for an interface template (or base interface) and one or more interface elements. The interface elements may correspond to one or more experiments implemented by the A/B testing system 26 and in which the user system 24 is enrolled. In some embodiments, the user key has a predetermined length.

At time $t_1$, the A/B testing system 26 generates an interface key 304 using a predetermined key optimization process 306a. For example, in the illustrated embodiment, the key optimization process 306a truncates the the user key 302 at a predetermined position which removes each identifier for the interface elements, leaving only an interface template identifier. The interface key is associated with one of a plurality of interface templates and is provided to the cache system 30 to load the interface template.

At time $t_2$, the A/B testing system 26 generates a first element key 308a using a predetermined key optimization process 306b. For example, in the illustrated embodiments, the key optimization process 306b truncates the user key 302 at a first predetermined element position to remove each element identifier positioned after the first element identifier 310 in the user key 302. The optimized first element key 308a is provided to the cache system 28 to load the first interface element identified by the first element key 308a, which is positioned in a first position in the interface template.

At time $t_n$, the A/B testing system 26 generates an nth element key 308b using a predetermined key optimization process 306c. In the illustrated embodiment, the A/B testing system 26 truncates the user key 302 at an nth predetermined position to remove each element identifier positioned after the nth element identifier in the user key 302. The optimized nth element key 308b is provided to the cache system 28 to load the nth interface element identified by the nth element key 308b, which is positioned in an nth position in the interface template.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
communications interface configured to communicate with a first user device and a cache system;
memory resource storing instructions; and
one or more processors coupled to the communications interface and the memory resource, the one or more processors are configured to execute the instructions to:
receive, from the first user device, a request for a user interface, wherein the request includes a user key;
generate an interface key corresponding to an interface template of the requested user interface, wherein the interface key is generated from the user key;
based on the interface key, load, by utilizing the cache system, the interface template of the requested user interface, wherein the interface template includes one or more edge side include (ESI) identifiers in the interface template;
generate an element key corresponding to a first ESI element associated with a first of the one or more ESI identifiers, wherein the element key is generated from the user key;
generating a complete user interface by loading the first ESI element into the interface template, wherein the ESI element is positioned at a location within the interface template identified by the first of the one or more ESI identifiers; and
provide the complete user interface to the first user device.

2. The system of claim 1, wherein the interface key is generated by truncating the user key at a first predetermined position.

3. The system of claim 2, wherein the element key is generated by truncating the user key at
a second predetermined position.

4. The system of claim 1, wherein the one or more processors are configured to execute the instructions further to:
generate the user key; and
transmit the user key to the first user device for storage.

5. The system of claim 4, wherein the user key is generated by:
generating a template identifier for the requested user interface;
assigning a user system to one or more experiments associated with the requested user interface;
generating an element identifier for each experiment of the one or more experiments assigned to the user system; and
sequentially combining the template identifier and each element identifier to generate the user key.

6. The system of claim 5, wherein the element identifier for each experiment of the one or more experiments is one of a control element identifier or a variant element identifier.

7. The system of claim 1, wherein the one or more processors are configured to execute the instructions further to:
perform a cache lookup using one of the interface key or the element key;
on a cache miss:

load a corresponding one of the interface template or the ESI element from an interface database; and
store the corresponding one of the interface template or the ESI element in a cache; and
on a cache hit:
load the corresponding one of the interface template or the ESI element from the cache.

8. The system of claim 1, wherein the one or more processors are configured to execute the instructions further to store the complete user interface in the cache prior to transmitting the complete user interface to a user system.

9. The system of claim 8, wherein the one or more processors are configured to execute the instructions further to remove the complete user interface from the cache after a predetermined period after a last communication from the user system.

10. A non-transitory computer readable medium having instructions stored thereon, wherein the instructions, when executed by a processor cause a device to perform operations comprising:
receiving, from a first user device, a request for a user interface, wherein the request includes a user key;
generating an interface key corresponding to an interface template of the requested user interface, wherein the interface key is generated from the user key;
based on the interface key, loading, by utilizing a cache system, the interface template of the requested user interface, wherein the interface template includes one or more edge side include (ESI) identifiers in the interface template;
generating an element key corresponding to a first ESI element associated with a first of the one or more ESI identifiers, wherein the element key is generated from the user key;
generating a complete user interface by loading the first ESI element into the interface template, wherein the ESI element is positioned at a location within the interface template identified by the first of the one or more ESI identifiers; and
providing the complete user interface to the first user device.

11. The non-transitory computer readable medium of claim 10, wherein the interface key is generated by truncating the user key at a first predetermined position.

12. The non-transitory computer readable medium of claim 11, wherein the element key is generated by truncating the user key at a second predetermined position.

13. The non-transitory computer readable medium of claim 10, wherein the instructions, when executed by the processor cause the device to perform further operations comprising:
generating the user key; and
transmitting the user key to the first user device for storage.

14. The non-transitory computer readable medium of claim 13, wherein the user key is generated by:
generating a template identifier for the requested user interface;
assigning a user system to one or more experiments associated with the requested user interface;
generating an element identifier for each experiment of the one or more experiments assigned to the user system; and
sequentially combining the template identifier and each element identifier to generate the user key.

15. The non-transitory computer readable medium of claim 14, wherein the element identifier for each experiment of the one or more experiments is one of a control element identifier or a variant element identifier.

16. The non-transitory computer readable medium of claim 10, wherein the instructions, when executed by the processor cause the device to perform further operations comprising:
performing a cache lookup using one of the interface key or the element key;
on a cache miss:
loading a corresponding one of the interface template or the ESI element from an interface database; and
storing the corresponding one of the interface template or the ESI element in a cache; and
on a cache hit:
loading the corresponding one of the interface template or the ESI element from the cache.

17. The non-transitory computer readable medium of claim 10, wherein the instructions, when executed by the processor cause the device to perform further operations comprising storing the complete user interface in the cache prior to transmitting the complete user interface to a user system.

18. The non-transitory computer readable medium of claim 17, wherein the instructions, when executed by the processor cause the device to perform further operations comprising removing the complete user interface from the cache after a predetermined period after a last communication from the user system.

19. A method, comprising:
receiving, by a processor and from a first user device, a request for a user interface, wherein the request includes a user key;
generating, by the processor, an interface key corresponding to an interface template of the requested user interface, wherein the interface key is generated from the user key;
based on the interface key, loading, by the processor utilizing a cache system, the interface template of the requested user interface, wherein the interface template includes one or more edge side include (ESI) identifiers in the interface template;
generating, by the processor, an element key corresponding to a first ESI element associated with a first of the one or more ESI identifiers, wherein the element key is generated from the user key;
generating, by the processor, a complete user interface by loading the first ESI element into the interface template, wherein the ESI element is positioned at a location within the interface template identified by the first of the one or more ESI identifiers; and
providing, by the processor, the complete user interface to the first user device.

20. The method of claim 19, wherein the interface key is generated by truncating the user key at a first predetermined position and the element key is generated by truncating the user key at a second predetermined position.

* * * * *